United States Patent [19]

Bauer

[11] 4,331,236

[45] May 25, 1982

[54] CONTAINER FOR X-RAY FILM

[75] Inventor: Walter Bauer, Munich, Fed. Rep. of Germany

[73] Assignee: Agfa-Gevaert Aktiengesellschaft, Leverkusen, Fed. Rep. of Germany

[21] Appl. No.: 112,154

[22] Filed: Jan. 15, 1980

[30] Foreign Application Priority Data

Jan. 19, 1979 [DE] Fed. Rep. of Germany ....... 2901978

[51] Int. Cl.³ ............... B65D 81/30; H05G 1/28; G03B 41/16; A65D 65/20
[52] U.S. Cl. .............................. 206/455; 206/459; 206/45.31
[58] Field of Search ............ 206/455, 459, 45.31, 206/534

[56] References Cited

U.S. PATENT DOCUMENTS 2,383,132  8/1945  Kohl .................................. 206/45.31
3,537,422  11/1970  Moe .................................... 206/534
4,194,625  3/1980  Stievenart et al. .................. 206/455

Primary Examiner—William T. Dixson, Jr.
Attorney, Agent, or Firm—Kontler & Grimes

[57] ABSTRACT

A cassette for X-ray film has a first chamber for the film and a relatively narrow elongated second chamber for the major part of an elongated data-carrying card a portion of which extends outwardly through a window in the cover of the container. The two chambers are separated from each other by a partition which has a sealable aperture in register with the window.

11 Claims, 2 Drawing Figures

CONTAINER FOR X-RAY FILM

BACKGROUND OF THE INVENTION

The present invention relates to containers for storage of radiation-sensitive sheet material, especially to cassettes for X-ray film. More particularly, the invention relates to improvements in containers of the type having a sealable window which, when open, allows the application (normally exposure) of information to radiation-sensitive material.

Many presently known cassettes for X-ray film are provided with clips in the form of leaf springs which are attached to the covers of the respective cassettes and serve to retain data sheets. A sheet which is to accompany the cassette is clamped between the cover and the leaf spring. The thus clamped data sheet remains in such position until after the exposure of X-ray film in the respective cassette. The exposure of the image of a portion of a patient's body onto the film is followed by or takes place simultaneously with the application of information to the film through the aforementioned window. The data sheet is thereupon removed because the pertinent information which is needed for proper identification of images is permanently applied to the respective X-ray film.

Since the leaf spring clamps a relatively small portion of a data sheet (namely, a single location), the sheet is likely to become detached from the respective cover and/or to undergo undesirable deformation or other damage. Moreover, the clip is likely to injure the fingers or hands of the users (e.g., nurses) and/or to prevent adequate stacking of two or more cassettes side-by-side or on top of each other.

OBJECTS AND SUMMARY OF THE INVENTION

An object of the invention is to provide containers for radiation-sensitive material, especially cassettes for X-ray film, with novel and improved means for temporary retention of data-carrying sheets or the like.

Another object of the invention is to provide a container which is constructed and assembled in such a way that a sheet which is attached thereto is not likely to be lost and much less likely to be deformed and/or otherwise damaged than in heretofore known containers.

A further object of the invention is to provide a container with novel and improved means for concealing major portions of or entire data-carrying sheets.

An additional object of the invention is to provide a container which can safely hold and confine data-carrying sheets even though its cover does not carry a metallic or plastic clip.

Another object of the invention is to provide a container for X-ray film or the like which is less likely to cause injury to the users than heretofore known containers.

A further object of the invention is to provide a container which can be stacked on top of or side by side with similar containers, i.e., in substantially vertical or substantially horizontal planes.

The invention is embodied in a container for radiation-sensitive material, particularly X-ray film, and for data-carrying sheets having a predetermined width. The container comprises a housing including wall means defining a first chamber which serves for storage of radiation-sensitive material and a second chamber having an open portion (this open portion preferably constitutes an end portion of the second chamber). The second chamber has a width which is at least equal to the width of a data-carrying sheet and a length such that at least a substantial part of the data-carrying sheet can be inserted into the second chamber by way of the open portion.

The second chamber can be defined by the openable cover and an internal partition of the housing. The cover is preferably provided with a window for exposure of a portion of the radiation-sensitive material in the first chamber so that such portion of the radiation-sensitive material stores information at least some of which is also stored on the data-carrying sheet. The window can constitute the aforementioned open portion of the second chamber. The window can be sealed from the first chamber by a door or closure which is movable between operative (sealing) and inoperative (radiation-transmitting) positions.

The novel features which are considered as characteristic of the invention are set forth in particular in the appended claims. The improved container itself, however, both as to its construction and the mode of using the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
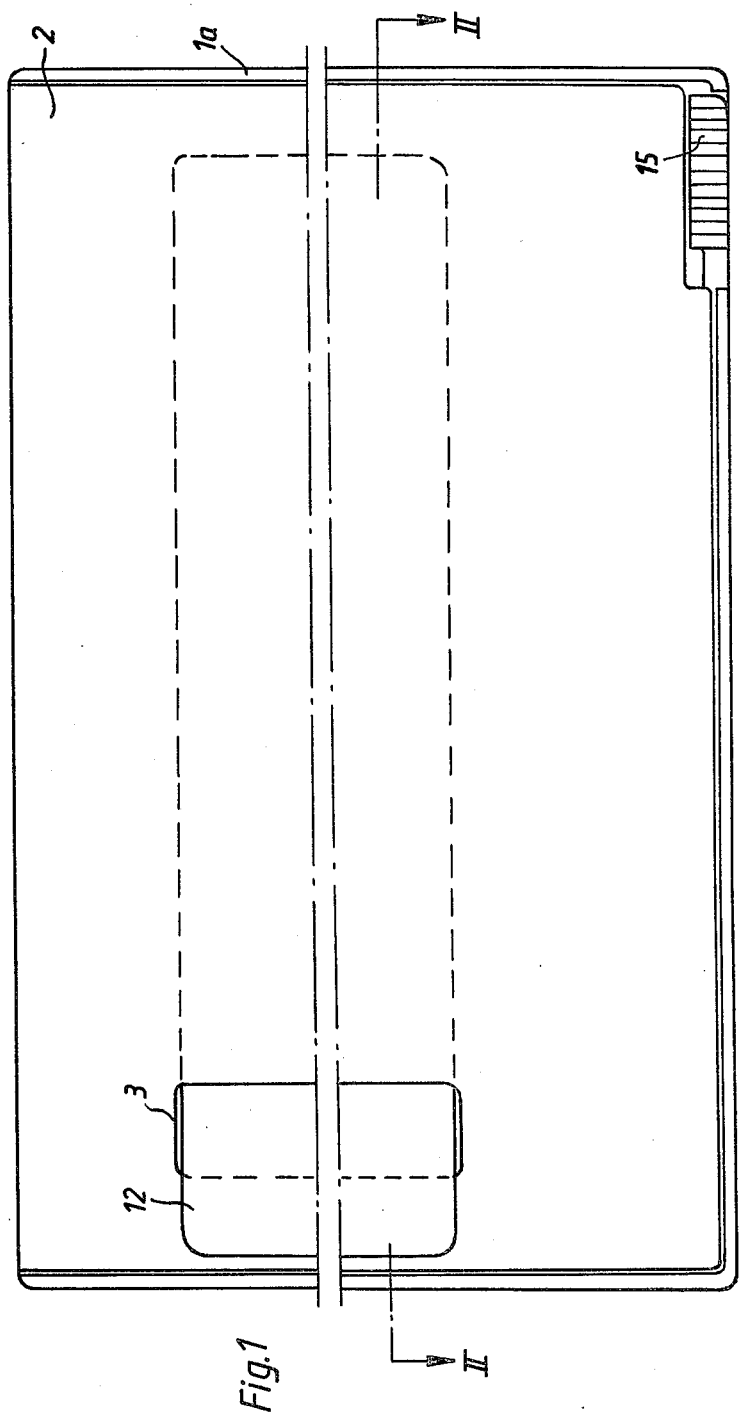
FIG. 1 is a fragmentary schematic plan view of a container which embodies the invention, a data-carrying sheet being inserted into the second chamber of the housing.
Figure 2:
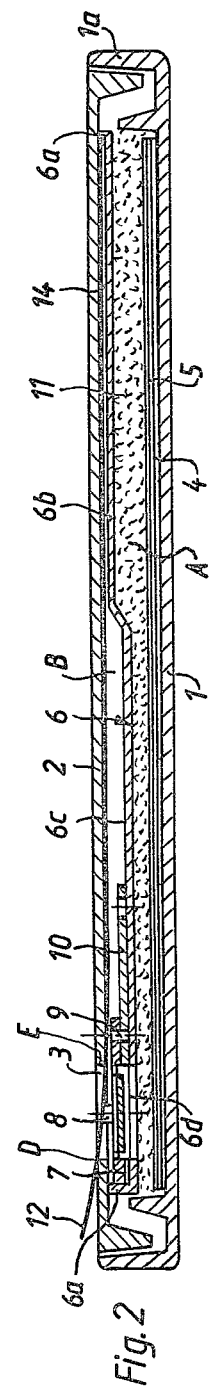
FIG. 2 is a sectional view as seen in the direction of arrows from the line II—II of FIG. 1.

The container which is shown in FIGS. 1 and 2 is a flat cassette for X-ray film 5. The cassette comprises a housing having several walls including a rectangular bottom wall 1 with upstanding side walls 1a and a top wall or cover 2 which overlies the bottom wall 1 when the container is closed. The cover 2 has a window 3 which renders it possible to expose a portion of the X-ray film 5 so as to permanently apply certain data including the name of the patient, the date of exposure of a selected portion of the patient's body to X-rays and/or other data.

The inner side of the bottom wall 1 is covered by an intensifying foil 4 which, in turn, is overlapped by the X-ray film 5. The housing further comprises an intermediate wall or partition 6 which divides the interior of the housing into a first chamber A for the film 5 and a second chamber B for a removable or extractable elongated data-carrying sheet or card 12. The marginal portion 6a of the partition 6 abuts against the inner side of the cover 2 so as to ensure that the distance between the major parts of the cover 2 and partition 6 cannot be reduced below a preselected value. The partition 6 includes a first section or panel 6b which is rather close to the inner side of the cover 2 and a second section or panel 6c which is disposed at a greater distance from the inner side of the cover. Each of the sections 6b, 6c may constitute approximately one-half of the main part of the partition 6 within the confines of the marginal portion 6a. The width of the narrow gap between the cover 2 and section 6b is somewhat in excess of the thickness of the card 12 (such gap forms part of the chamber B). The gap between the section 6c and the cover 2 is wider than the aforementioned gap of the second chamber B so as to provide room for the corresponding portion of the card 12 as well as for a closure or door 7 which can be moved to and from a position of register with the window 3. This window constitutes an open portion of the chamber B and is in register with an aperture or cutout 6d of the section 6c. The closure 7 is movable by way of an actuating pin or post 8. The wider portion or gap of the chamber B further accommodates the holding or mounting elements 9, 10 for the closure 7. When the closure 7 is moved to the operative position, it seals the aperture 6d and thus seals the film 5 against entry of radiation which penetrates into the chamber B via the window 3. The dimensions and configuration of the aperture 6d may but need not match the dimensions and configuration of the window 3.

That side of the partition 6 which faces the film 5 in the chamber A is coated with a layer 11 of foamed synthetic plastic material which presses the film 5 against the foil 4 when the cassette is closed. The means for releasably locking the cover 2 to the bottom wall 1 is shown schematically at 15. The exact construction of such locking means forms no part of this invention.

The data-carrying sheet 12 resembles or constitutes a conventional elongated punched card and has a width which equals or is somewhat less than the width of the chamber B and window 3. When it is about to be introduced into the chamber B, the sheet or card 12 is manipulated in such a way that its leader passes through the window 3, thereupon through the relatively wide gap between the section 6c and cover 2 and finally into the right-hand end of the narrower gap between the section 6b and cover 2. The length of the chamber B is preferably such that the left-hand end portion of the card 12 extends outwardly beyond the window 3 when the right-hand end portion of the card is received in the rightmost portion of the chamber B. Since the cards 12 exhibit a certain amount of stiffness, the frictional engagement between the inserted card and the cover 2 as well as between the card and the partition 6 is sufficient to prevent accidental shifting of the inserted card in a direction to remove it from the chamber B. The aforementioned stiffness causes the card 12 to bear against the outer side of the cover 2 at D, against the inner side of the cover 2 at E, and against the upper side of the section 6b. Such frictional engagement invariably suffices to prevent any lengthwise displacement of the card when the cassette is held in an upright position so that it rests on the left-hand side wall 1a, as viewed in FIG. 2.

If desired, the likelihood of losing an inserted card 12 can be reduced still further by coating at least one side of the relatively narrow gap between the section 6b and the cover 2 with a liner 14 of friction generating material. Such liner may consist of velvet or the like. Also, the chamber B can contain one or more springs which yieldably engage the inserted card 12 and serve the same purpose as the liner 14.

In the illustrated embodiment, the window 3 is provided in the cover 2 whereas the aperture 6d is formed in the partition 6. Also, the closure 7 is mounted on or in the partition 6. It is equally within the purview of the invention to make the partition 6 an integral part of the housing including the walls 1, 2 or to employ a discrete insert (e.g., an insert made of synthetic plastic material) which defines the entire chamber B and is detachably or permanently secured to the inner side of the cover 2. The latter is then merely provided with a slot for insertion of a card 12 into the window of the insert. Alternatively, the aforementioned insert can be installed in a suitable complementary recess of the cover 2.

The means (including the parts 8, 9, 10) for movably mounting the closure 7 so as to seal or expose the aperture 6d can be constructed and assembled in a manner as shown in FIGS. 3 and 4 of U.S. Pat. No. 3,628,864 to Fessenden et al.

An important advantage of the improved cassette is that it greatly reduces the likelihood of deformation (such as bending, creasing or folding) of the card 12 and that the card is much less likely to become detached than in heretofore known cassettes. Moreover, the user is not likely to injure his or her hands because the cassette need not be provided with external card clamping means.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A container for radiation-sensitive material, particularly X-ray film, and for data-carrying sheets having a predetermined width, comprising wall means defining a first chamber for radiation-sensitive material and a second chamber for a data-carrying sheet, said second chamber having an open portion, and said second chamber having a width at least equal to said predetermined width and a length such that at least a substantial part of a data-carrying sheet can be inserted into said second chamber by way of said open portion, said wall means including spaced first and second walls which bound and are at least coextensive with said chambers, and said wall means further including a partition between said first and second walls separating said chambers from each other; and a movable closure means for establishing communication between said chambers so as to permit imaging of data from a data-carrying sheet onto the radiation-sensitive material and for sealing said chambers from each other.

2. The container of claim 1, wherein said length of said second chamber is sufficient to enable said second chamber to receive the major part of a data-carrying sheet.

3. The container of claim 1, wherein one of said walls has a window which constitutes said open portion of said second chamber.

4. The container of claim 1, wherein said second wall has an inner side and said partition is adjacent to but spaced from said inner side, said second chamber being disposed between said second wall and said partition.

5. The container of claim 1, wherein the area of said partition at least equals the area of the major part of a data-carrying sheet.

6. The container of claim 1, wherein said second chamber includes a portion which constitutes a gap.

7. The container of claim 1, wherein said open portion of said second chamber includes a window in said second wall and said partition has an aperture in register with said window.

8. The container of claim 7, wherein said establishing and sealing means includes a closure movable to and from a position in which said closure seals said aperture.

9. The container of claim 8, wherein said second chamber has a relatively deep portion adjacent to and a relatively shallow portion remote from said open portion, said closure being installed in said relatively deep portion of said second chamber.

10. The container of claim 9, further comprising means for mounting said closure in said relatively deep portion and means for moving said closure to and from said position, said moving means being installed in said relatively deep portion.

11. A container for radiation-sensitive material, particularly X-ray film, and for data-carrying sheets having a predetermined width, comprising a housing including wall means defining a first chamber for radiation-sensitive material and a second chamber for a data-carrying sheet, said second chamber having an open portion and a relatively shallow portion, and said second chamber having a width at least equal to said predetermined width and a length such that the major part of a data-carrying sheet can be inserted into said second chamber by way of said open portion; means for normally sealing said second chamber from said first chamber; and a liner of friction generating material at least partially surrounding said shallow portion so as to engage a data-carrying sheet which is inserted into said second chamber.

* * * * *